Sept. 27, 1960

H. E. SINGHAUS

SELECTOR FOR A MULTIPLE TRACK RECORD
OF A MAGNETIC MEMORY SYSTEM

Filed Feb. 16, 1956

2,954,547

INVENTOR
H. E. SINGHAUS
BY
Campbell, Brumbaugh, Free & Graves
HIS ATTORNEYS

United States Patent Office 2,954,547

Patented Sept. 27, 1960

2,954,547

SELECTOR FOR A MULTIPLE TRACK RECORD OF A MAGNETIC MEMORY SYSTEM

Howard E. Singhaus, Mountain View, Calif., assignor to International Business Machines Corporation, New York, N.Y., a corporation of New York Filed Feb. 16, 1956, Ser. No. 565,993

7 Claims. (Cl. 340—174.1)

This invention relates to a multiple magnetic head assembly for a magnetic memory system wherein any one of the multiple magnetic heads can be quickly selected and adjusted into operative relationship with respect to a record member having a plurality of magnetic recording tracks thereon.

In the multiple magnetic head assembly of the present invention, a plurality of magnetic heads are mounted on a common support member. The support member extends across a plurality of record tracks of the record member, and the support member is mounted for rotation about its longitudinal axis. The magnetic heads are supported on said rotatable member in such fashion that the air gaps thereof are oriented around said common support member at different angles relative to the axis of rotation thereof. Therefore, by means of this arrangement, the rotational adjustment of said support member about its axis will serve to bring the air gap of any selected magnetic head into operative relationship with respect to the record member, and at this adjusted position the air gaps of all of the other magnetic heads will be disposed in inoperative relationship with respect to the record member.

In addition to rotary adjustment of the support member about its longitudinal axis, the support member may be translated in the direction of its axis so that each of the magnetic heads supported thereon may be brought into operative relationship with respect to any of several tracks.

The multiple magnetic head assembly of the present invention, therefore, offers the advantage of rapid access to any of a plurality of available record tracks of the magnetic memory system.

For a complete understanding of the present invention, reference may be made to the detailed description of the invention which follows and to the accompanying drawings wherein.

Figures 1, 2, 3, 4:
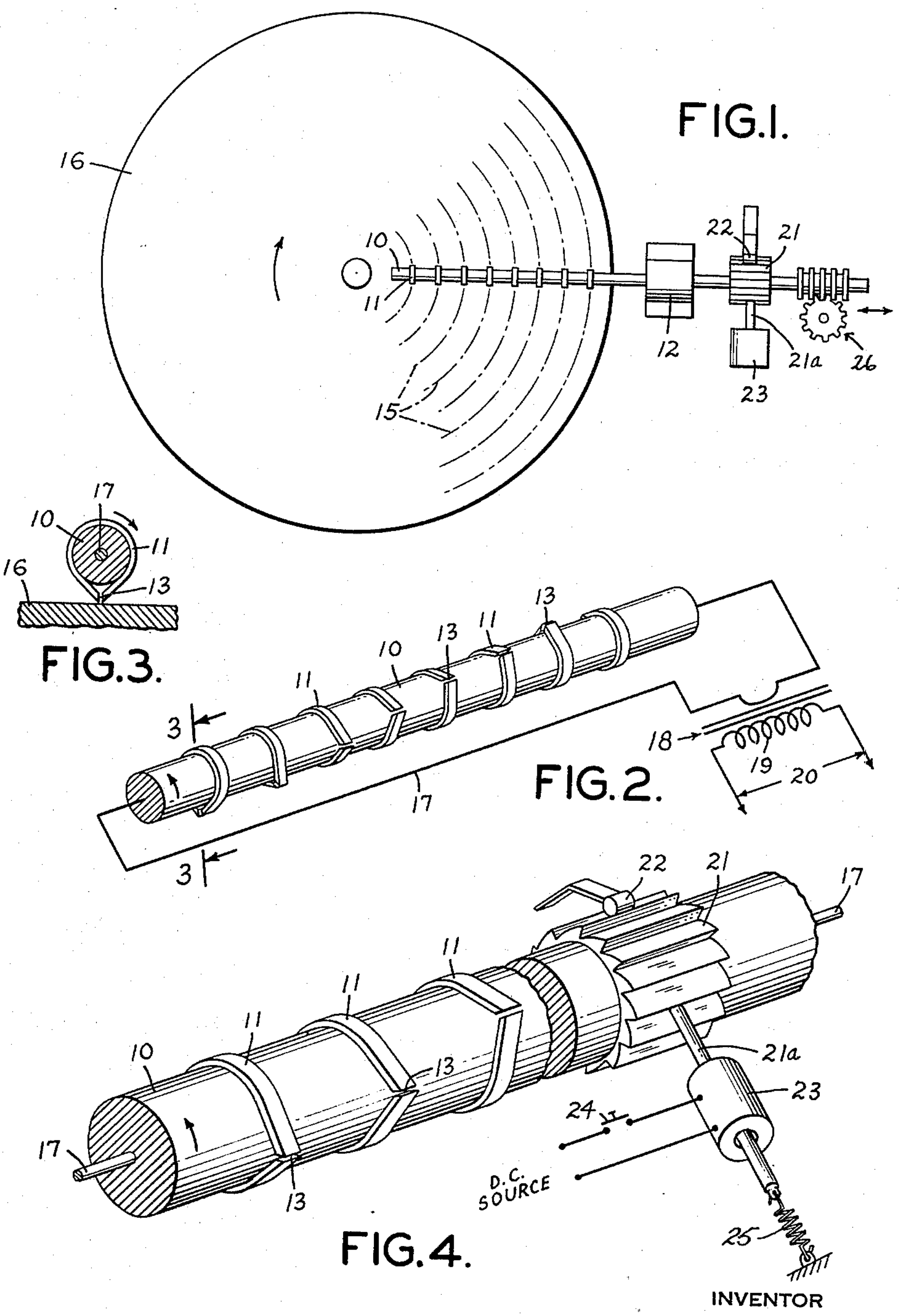
Figure 1 is a plan view of the multiple head assembly of the present invention.
Figure 2 is a perspective view of the assembly showing the orientation of the magnetic heads.
Figure 3 is a cross-section view taken along the line 3—3 of Figure 2, looking in the direction of the arrows.
Figure 4 is an enlarged perspective view of the assembly showing the means for rotating the assembly to select different magnetic heads.

Referring to the drawings, a hollow support member 10 for a plurality of magnetic heads 11 is rotatably supported in a bearing 12. The magnetic heads 11 each comprises a magnetic bar which substantially encircles the support member 10, the ends of the magnetic bar being spaced apart to provide an air gap 13 therebetween. The magnetic heads 11 are spaced apart at substantially equal distances along the axis of the rotatable support member 10, and the air gaps 13 thereof are oriented around the support member at different angles, preferably equally spaced angles, with respect to the axis of rotation of the support member.

The rotatable support member 10 extends across a plurality of the magnetic record tracks 15 of a magnetic record disk 16 with each of the magnetic heads overlying at least one of the record tracks. The orientation of the air gaps 13 of the magnetic heads 11, however, insures that the air gap of only one of the magnetic heads will be disposed in operative proximity to the surface of the record disk 16.

The support member 10 is preferably hollow to accommodate an endless conductor 17 which passes through the hollow center, and the conductor 17 is magnetically coupled to a winding 19 by a transformer 18. In the embodiment shown in the drawings, the conductor 17 forms only a single turn coil with the transformer. A greater number of turns, however, may be used, if desired.

The terminals 20 of the winding 19 may serve as either the input or the output terminals of the transformer, depending on whether the operative magnetic head is being utilized for recording information onto the record disk 16 or receiving information therefrom. When the operative magnetic head is being used for recording information onto the record member, the input signal is impressed across the terminals 20 and the induced flow of current in the coil 17 produces variations in the magnetic flux across the air gap 13 which are recorded on a track of the record member. On the other hand, when the magnetic head serves to receive information previously recorded on the record member, the information on the record track will influence the magnetic flux across the air gap of the operative magnetic head, inducing a flow of current in the coil 17 which may be received at the terminals 20.

As mentioned above, the rotation of the support member 10 about its axis serves to bring a different magnetic head 11 into operative relationship with the record disk 16. Although it is understood that various means may be employed for effecting the rotation of the support member about its axis, the means shown in Figure 4 for purposes of illustration includes a ratchet wheel 21 mounted on the rotatable support member 10, a solenoid actuated plunger **21*a* engageable with said ratchet wheel to effect a predetermined angular rotation of the support member on each stroke thereof, and a spring urged detent member 22 which engages the outer periphery of the ratchet wheel 21 to maintain the rotatable support member in adjusted position. The operative stroke of the actuating plunger 21*a* is controlled by the energization of a solenoid 23 when a switch 24 is closed, and the return stroke of the actuating plunger is effected by a spring 25** when the switch is opened.

In addition to the rotary movement imparted to the support member 10 to adjust a selected magnetic head into operative relationship with the record member, provision can be made, such as by a rack and pinion generally designated 26, for limited displacement of the support bar along its axis so that each head can operate in cooperation with any of several record tracks on the record member. The bearing 12, in this case, will support the member 10 both for rotational and longitudinal movement. Due to the width of the ratchet wheel 21, axial displacement of the support member 10 is possible without disengaging the plunger **21*a* and spring detent 22** therefrom.

If the support member 10 is permitted a total linear movement in the axial direction of only 250 mils, it would be possible for each magnetic head to cover six tracks spaced 50 mils apart. It is understood, therefore, that the multiple magnetic head assembly of the present invention makes possible the use of a record member having a great many tracks thereon, while at the same time affording rapid access to any of the tracks.

The invention has been shown in preferred form only and by way of example, and obviously many variations and modifications may be made therein without departing from the spirit of the invention. The invention, therefore, is not to be limited to any specified form or embodiment except in so far as such limitations are set forth in the claims.

I claim:

1. A selector for a multiple track record of a magnetic memory system comprising multiple magnetic heads spaced apart from each other, and means for mounting said multiple magnetic heads for rotation about a common axis, said magnetic heads being oriented at different angles with respect to said common axis, adjustable means for rotating all of said magnetic heads in unison, the orientation of said magnetic heads relative to the common axis moving only one of said magnetic heads into operative relationship with respect to the record for any given adjustment of said adjusting means, and a conductor extending substantially along the common axis and being inductively coupled with all of said magnetic heads, whereby variations in the magnetic flux of the operative magnetic head will induce a flow of current in said conductor.

2. A selector for a multiple track record of a magnetic memory system comprising multiple magnetic heads spaced apart from each other, means for supporting said multiple magnetic heads, said magnetic heads being oriented at different positions relative to the record and at different angles with respect to a common axis, a conductor loop inductively coupled to all of said magnetic heads, said loop having a length which extends generally along said axis, and common means for adjusting all of said magnetic heads simultaneously to position a selected magnetic head in operative relationship with respect to said record, the orientation of said magnetic heads on said supporting means being such that when one magnetic head is adjusted to operative position with respect to the record, all of the other magnetic heads will be disposed in inoperative position with respect to the record.

3. A selector for a multiple track record of a magnetic memory system comprising multiple magnetic heads, a common rotatable support therefor extending across a plurality of the record tracks, said magnetic heads being spaced apart along the common support and being oriented thereon at different angles with respect to the axis of rotation of the support member, means for rotating the support member to bring a single selected magnetic head into operative relationship with respect to the record, and means for moving the support member in an axial direction.

4. A selector for a multiple track record of a magnetic memory system comprising a support member having a longitudinal axis which extends across a plurality of track of the record, means for mounting said support member for rotation about its axis, a plurality of magnetic members substantially encircling said support member, said magnetic members being spaced apart concentrically along the axis of said support member, the opposite ends of the magnetic members forming air gaps therebetween which are oriented at different angles with respect to the axis of rotation of the support member, whereby the rotation of the support member about its axis to position the air gap of a selected magnetic member in operative relationship with respect to the record adjusts the air gaps of the other magnetic members to inoperative position, and a conductor extending through said support member and the magnetic members substantially encircling said support member so as to be inductively coupled to the magnetic members.

5. A selector for a multiple track record of a magnetic memory system as set forth in claim 4 including a transformer having a winding inductively coupled with said conductor.

6. A selector for a multiple track record of a magnetic memory system comprising a support member extending across a plurality of tracks of said record, means for mounting said support member for rotation about its axis, a plurality of magnetic bars substantially encircling the support member, said bars being spaced apart concentrically along the axis of said support member, the ends of said magnetic bars producing an air gap therebetween, the air gaps of the magnetic bars being oriented on the support member at different angles with respect to the axis of rotation thereof, whereby the air gap of no more than one magnetic bar can be adjusted into operative position with respect to the record at any adjusted position of rotation of the support member, means for imparting rotation to said support member to position a selected magnetic head in operative relationship with respect to the record member and a conductor which extends through the center of said support member, being thereby magnetically coupled to all of said magnetic bars.

7. A multiple magnetic head assembly comprising a plurality of magnetic heads spaced apart from each other side by side but oriented at different angles with respect to the plane of a record, a common conductor inductively coupled to a plurality of said magnetic heads, common adjusting means for controlling the positioning of all of said magnetic heads so that when a selected magnetic head is brought into operative position with respect to the plane of the record, another magnetic head is moved out of operative position, and means for locating and holding said selected magnetic head against rotation to maintain a selected head in operative position with respect to the plane of the record.

References Cited in the file of this patent

UNITED STATES PATENTS

| | | |
|---|---|---|
| 2,352,023 | Schuller | June 20, 1944 |
| 2,416,445 | Jensen | Feb. 25, 1947 |
| 2,539,837 | Howell | Jan. 30, 1951 |
| 2,561,476 | Lang | July 24, 1951 |
| 2,645,494 | Keller | July 14, 1953 |
| 2,751,274 | Andrews | June 19, 1956 |
| 2,831,180 | Hasbrouck | Apr. 15, 1958 |

OTHER REFERENCES

"Combined Reading and Writing on a Magnetic Drum" (McGuigan), Proceedings of the I.R.E., October 1953, pages 1438–1444.